(12) United States Patent
Dawe et al.

(10) Patent No.: US 10,926,724 B2
(45) Date of Patent: Feb. 23, 2021

(54) ELECTROSTATIC DISCHARGE ASSEMBLY FOR A VEHICLE

(71) Applicant: Nissan North America, Inc., Franklin, TN (US)

(72) Inventors: Brandon Michael Dawe, Livonia, MI (US); Carson Chandler Beauchaine, Clinton Township, MI (US)

(73) Assignee: Nissan North America, Inc., Franklin, TN (US)

( * ) Notice: Subject to any disclaimer, the term of this patent is extended or adjusted under 35 U.S.C. 154(b) by 242 days.

(21) Appl. No.: 16/051,283

(22) Filed: Jul. 31, 2018

(65) Prior Publication Data

US 2020/0039457 A1 Feb. 6, 2020

(51) Int. Cl.
| | |
|---|---|
| *B60R 16/06* | (2006.01) |
| *F02M 37/00* | (2006.01) |
| *F16L 55/00* | (2006.01) |
| *B60K 15/01* | (2006.01) |
| *H05F 3/04* | (2006.01) |

(52) U.S. Cl.
CPC .............. *B60R 16/06* (2013.01); *B60K 15/01* (2013.01); *F02M 37/007* (2013.01); *F02M 37/0017* (2013.01); *F16L 55/00* (2013.01); *H05F 3/04* (2013.01)

(58) Field of Classification Search
CPC .... B60R 16/06; B60K 15/01; F02M 37/0017; F02M 37/007; F16L 55/00; F05F 3/04; H05F 3/00; H05F 3/04
See application file for complete search history.

(56) References Cited

U.S. PATENT DOCUMENTS

| | | | | |
|---|---|---|---|---|
| 5,898,560 | A * | 4/1999 | Flaynik, Jr. ............ | B01D 35/02 361/215 |
| 6,915,870 | B2 * | 7/2005 | Sugiyama ............... | B60R 16/06 180/69.4 |
| 7,163,117 | B2 | 1/2007 | Griffin et al. | |
| 9,539,964 | B2 * | 1/2017 | Koith ....................... | B60R 16/06 |
| 2009/0249951 | A1 | 10/2009 | Graber et al. | |
| 2017/0297426 | A1* | 10/2017 | Sperando ............ | B29C 45/7207 |
| 2018/0282037 | A1* | 10/2018 | Zant ...................... | B32B 27/286 |

FOREIGN PATENT DOCUMENTS

| | | |
|---|---|---|
| CN | 203305837 U | 11/2013 |
| JP | 2004324807 A * | 11/2004 |
| KR | 19990040426 U | 11/1999 |

OTHER PUBLICATIONS

Titan XD Forum "https://www.titanxdforum.com/forum/490-5-0l-cummins-v8-turbo-diesel/28633-sparking.html", Post #46 of 65, Nov. 21, 2017.

* cited by examiner

*Primary Examiner* — Gary L Laxton
(74) *Attorney, Agent, or Firm* — Global IP Counselors, LLP

(57) ABSTRACT

An electrostatic discharge assembly for a vehicle includes a conductive plastic tether and a pipe connector. The conductive plastic tether has a first end and a second end. The first end is configured to be connected to a vehicle frame. The pipe connector is configured to connect the second end of the conductive plastic tether to a first fuel pipe of the vehicle.

19 Claims, 6 Drawing Sheets

ELECTROSTATIC DISCHARGE ASSEMBLY FOR A VEHICLE

BACKGROUND

Field of the Invention

The present invention generally relates to an electrostatic discharge assembly for a vehicle. More specifically, the present invention relates to a fuel supply system of a vehicle having on electrostatic discharge assembly to provide a grounding path from a fuel pipe to a vehicle frame.

Background Information

A fuel system of a vehicle pumps fuel from a fuel tank through a filter to an engine through a fuel supply pipe. Fuel is returned to the fuel tank through a fuel return pipe.

SUMMARY

One object of the disclosure is to provide a grounding path for an electrostatic charge from a fuel pipe of a vehicle to a vehicle frame.

In view of the state of the known technology, one aspect of the present disclosure is to provide an electrostatic discharge assembly for a vehicle. The electrostatic discharge assembly includes a conductive plastic tether and a pipe connector. The conductive plastic tether has a first end and a second end. The first end is configured to be connected to a vehicle frame. The pipe connector is configured to connect the second end of the conductive plastic tether to a first fuel pipe of the vehicle.

Another aspect of the present invention includes a fuel supply system of a vehicle having a first fuel pipe. A conductive plastic tether has a first end and a second end. The first end is connected to a vehicle frame. A pipe connector connects the second end of the conductive plastic tether to the first fuel pipe of the vehicle.

Also other objects, features, aspects and advantages of the disclosed vehicle body structure will become apparent to those skilled in the art from the following detailed description, which, taken in conjunction with the annexed drawings, discloses exemplary embodiments of the electrostatic discharge assembly.

BRIEF DESCRIPTION OF THIS DRAWINGS

Referring now to the attached drawings which form a part of this original disclosure:

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
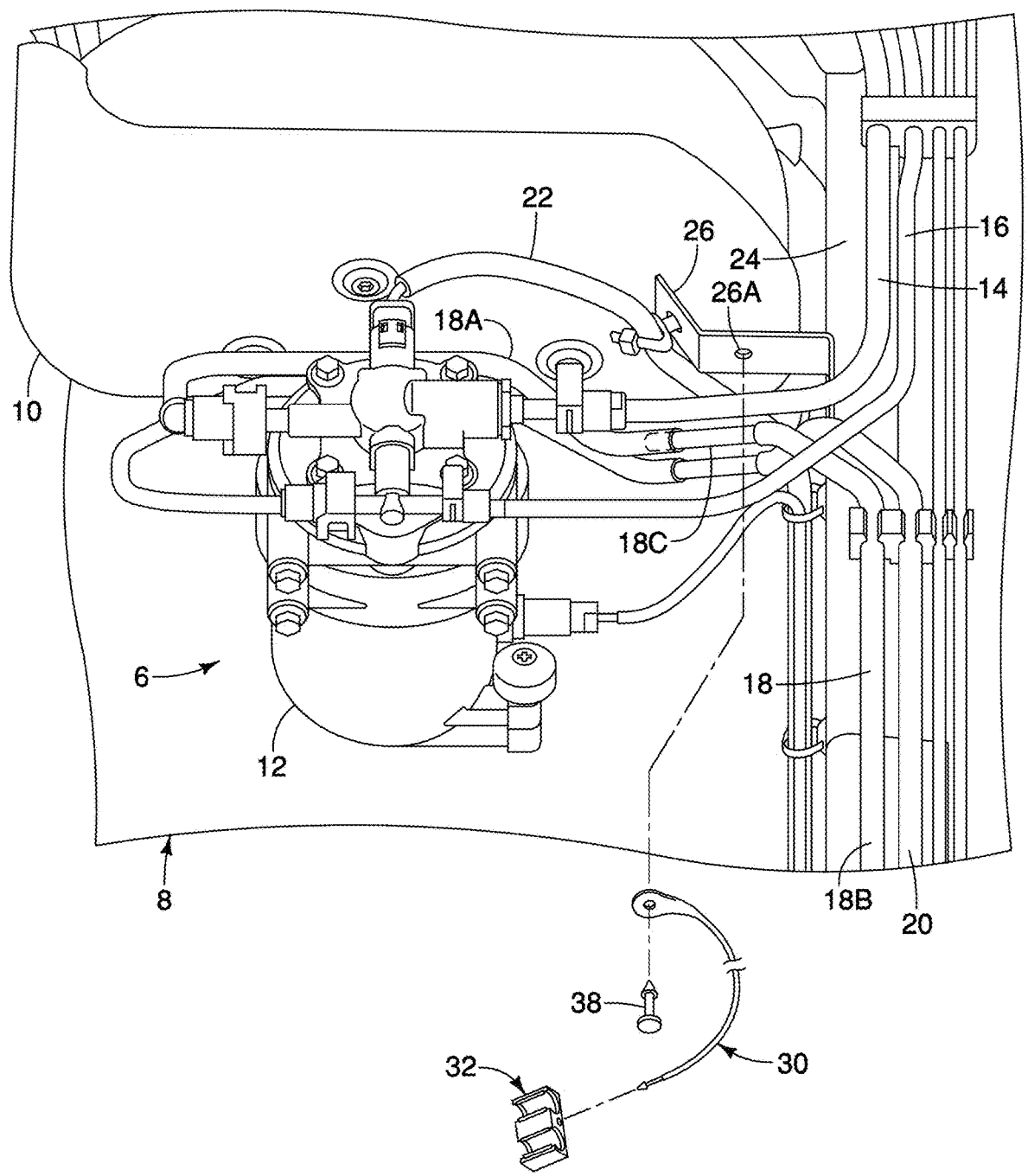
FIG. 1 is an exploded perspective view of a fuel system for a vehicle equipped with an electrostatic discharge assembly in accordance with an exemplary embodiment of the present invention.
Figure 2:
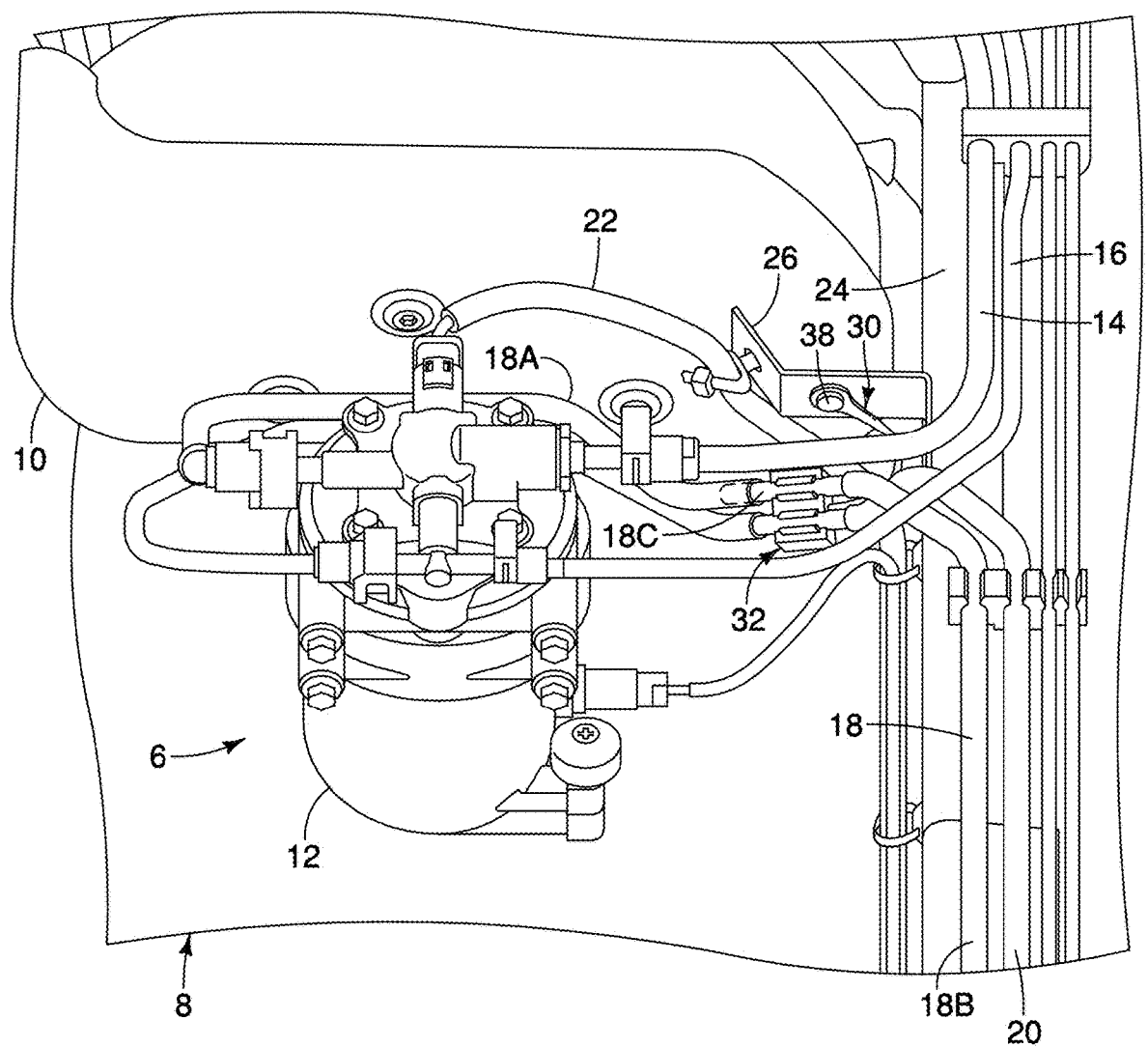
FIG. 2 is a perspective view of the electrostatic discharge assembly of FIG. 1 in which the electrostatic discharge assembly is connected to a vehicle frame.

Referring initially to FIGS. 1 and 2, a diesel fuel system 6 of a vehicle 8 includes a fuel tank 10 and a fuel pump and fitter assembly 12. Although the following description is for a diesel fuel system, the exemplary embodiments of the present invention are equally applicable to a gasoline fuel system. The fuel pump and filter assembly 12 pumps fuel from the fuel lank 10 to an engine (not shown). A pump supply pipe 14 supplies fuel from the fuel tank 10 to the fuel pump and filter assembly 12. A fuel tank return pipe 16 returns fuel from the fuel pump and filler assembly 12 to the fuel tank 10. An engine fuel supply pipe 18 supplies fuel from the fuel pump and filter assembly 12 to the vehicle engine. An engine fuel return pipe 20 returns fuel from the engine to the fuel pump and filter assembly 12. An electrical conduit 22 houses an electrical wire that supplies power to the fuel pump and filter assembly 12.

The engine fuel supply pipe 18 includes a first portion 18A connected to the fuel pump and filler assembly 12 and a second portion 18B connected to the engine. The first portion 18A of the engine fuel supply pipe 18 is preferably a non-conductive member, such as a nylon jumper tube. The second portion 18B of the engine fuel supply pipe 18 is preferably a polyamide (PA) resin coated steel lube, such as a steel tube having a nylon coating. The second portion 18B can have a polypropylene (PP) coating disposed on the polyamide resin coating to further protect the engine fuel supply pipe 18, such as from damage from debris during operation of the vehicle. The polypropylene (PP) coating can be applied in any suitable manner, such as by overmolding. As shown in FIGS. 1 and 2, a portion 18C of the engine fuel supply pipe 18 does not have the polypropylene (PP) coating. The portion 18C of the engine fuel supply pipe 18 not having the polypropylene (PP) coating is at a free end of the second portion 18B of the engine fuel supply pipe 18 to be connected to the first portion 18A. The free end of the second portion 18B of the engine fuel supply pipe 18 is connected to the free end of the first portion 18A of the engine fuel supply pipe 18 in any suitable manner, such as by press fitting or heat shrinking the free end of the first portion 18A onto the free end of the second portion 18B, thereby fluidly connecting the first and second portions 18A and 18B of the engine fuel supply pipe 18 to provide a fluid connection between the fuel pump and filter assembly 12 and the engine.

The fuel tank 10 is supported to the vehicle frame, such as to a longitudinally extending side member 24. The side member 24 extends in the longitudinal, or front to back, direction of the vehicle. The electrical conduit 22 is supported by a bracket 26, which is connected to the longitudinally extending side member 24.

An electrostatic discharge assembly 28 for a vehicle is illustrated in accordance with a first exemplary embodiment in FIGS. 1-7. As the fuel passes through the filter of the fuel pump and filter assembly 12 to the engine supply pipe 18, an electrostatic charge can be generated, particularly when the filter is made of a non-conductive material, such as paper. The electrostatic discharge assembly 28 provides a grounding path from the engine fuel supply pipe 18 to the vehicle frame, such as the bracket 26. Preferably, the electrostatic discharge assembly 28 is connected to the portion 18C of the second portion 18B of the engine fuel supply pipe 18. In other words, the electrostatic discharge assembly 28 is connected to the portion of the engine fuel supply pipe 18 that does not have the polypropylene (PP) coating thereon.

The electrostatic discharge assembly 28 includes a conductive plastic tether 30 and a pipe connector 32, as shown in FIGS. 1-7. The conductive plastic tether 30 has a first end 34 and a second end 36. The first end 34 is configured to be connected to the vehicle frame, such as to the bracket 26 connected to the side member 24. As shown in FIG. 1, the first end 34 of the conductive plastic tether is connected to the bracket 26 of the vehicle frame. An enlarged portion 34A is disposed proximal the first end 34 of the tether 30, as shown in FIG. 2. A fastener receiving opening 34B is disposed in the enlarged portion 34A of the tether 30 proximal the first end 34 of the tether 30. The fastener receiving opening 34B is configured to receive a fastener 38 to secure the tether 30 to the vehicle frame. A retaining member 40 is disposed at the second end 36 of the tether 30. The retaining member 40 is preferably substantially arrow-shaped, although any suitable shape can be used. A reduced diameter portion 42 is disposed adjacent the retaining member 40. The conductive plastic c tether 30 can be any suitable length, such as approximately 230 mm.

A pipe connector 32 is configured to connect the second end 36 of the conductive plastic tether 30 to the engine fuel supply, or a first, pipe 18 of the vehicle 8, as shown in FIGS. 1-6. The pipe connector 32 has a first pipe receiving portion 44 configured to receive the engine fuel supply pipe 18 and a second pipe receiving portion 46 configured to receive the engine fuel return, or a second, pipe 20.

Figure 3:
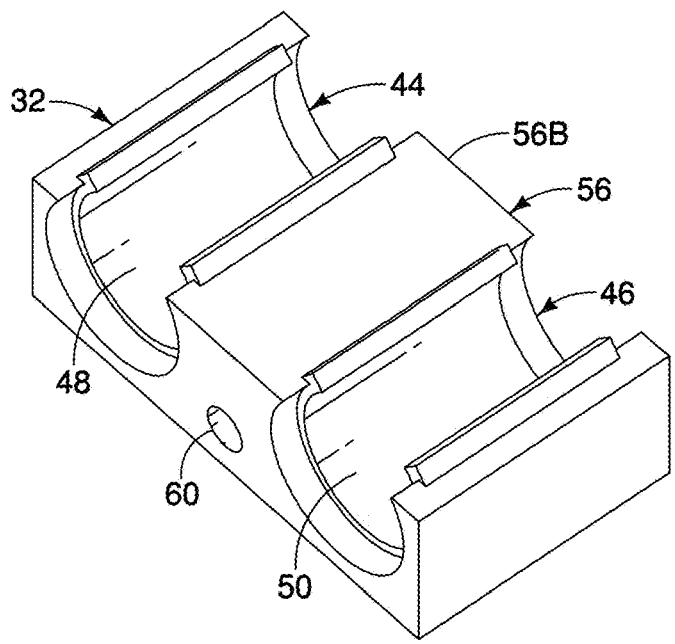
FIG. 3 is a perspective view of a pipe connector of the electrostatic discharge assembly of FIG. 1.
Figure 4:
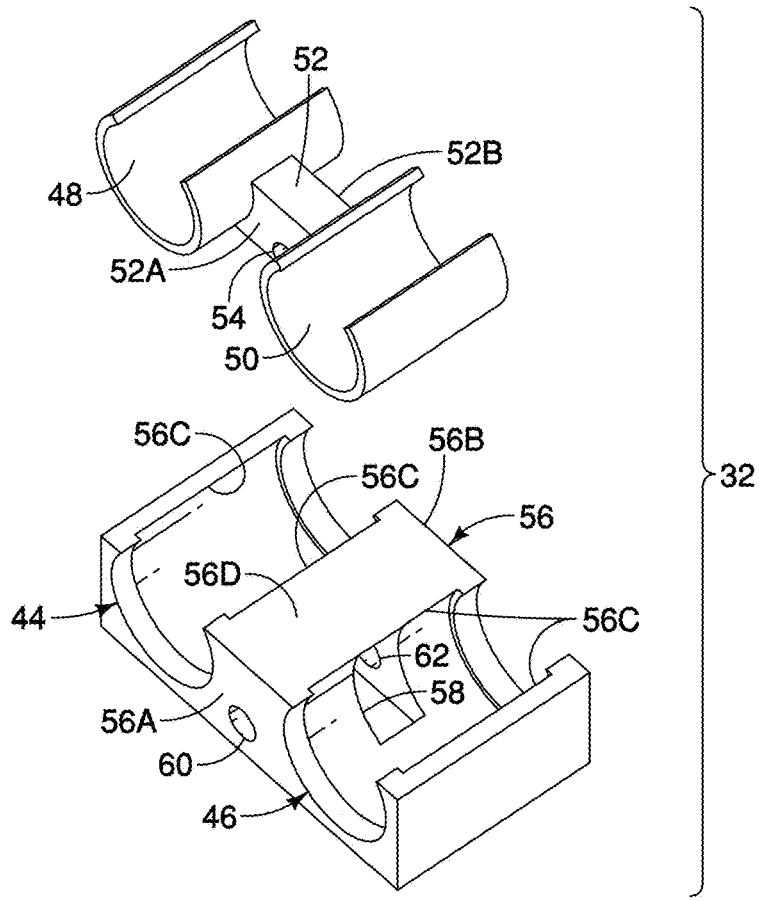
FIG. 4 is an exploded perspective view of the pipe connector of FIG. 3.

The first pipe receiving portion 32 includes a first pipe receiving layer 48 configured to directly contact the engine fuel supply pipe 18 received by the first pipe receiving portion 44. The second pipe receiving portion 32 includes a second pipe receiving layer 50 configured to directly contact the engine fuel return pipe 20 received by the second pipe receiving portion 46. As shown in FIGS. 3 and 4, the first and second pipe receiving layers 48 and 50 have shapes corresponding to the diameters of the received pipes 18 and 20. The first and second pipe receiving layers 48 and 50 are made of a conductive plastic.

Figure 5:
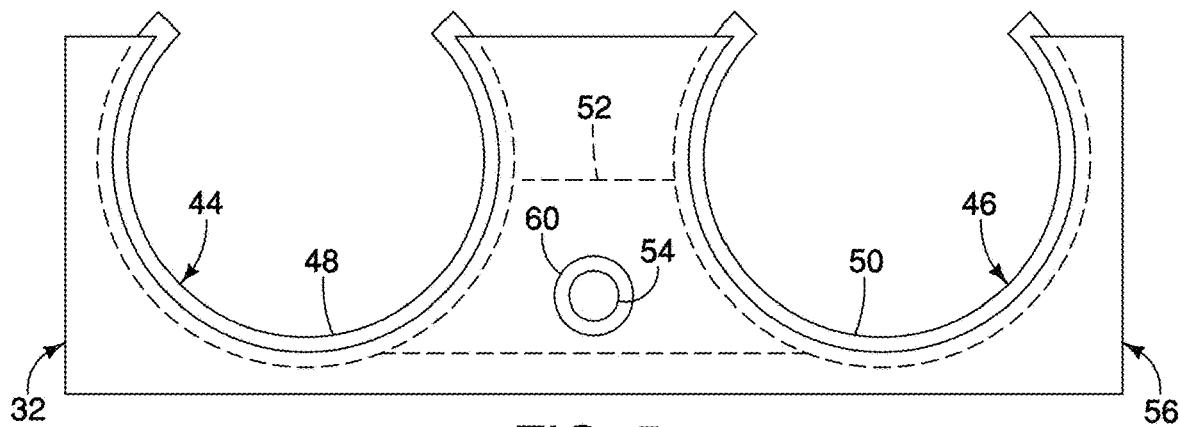
FIG. 5 is a from elevational view of the pipe connector of FIG. 3.
Figure 6:
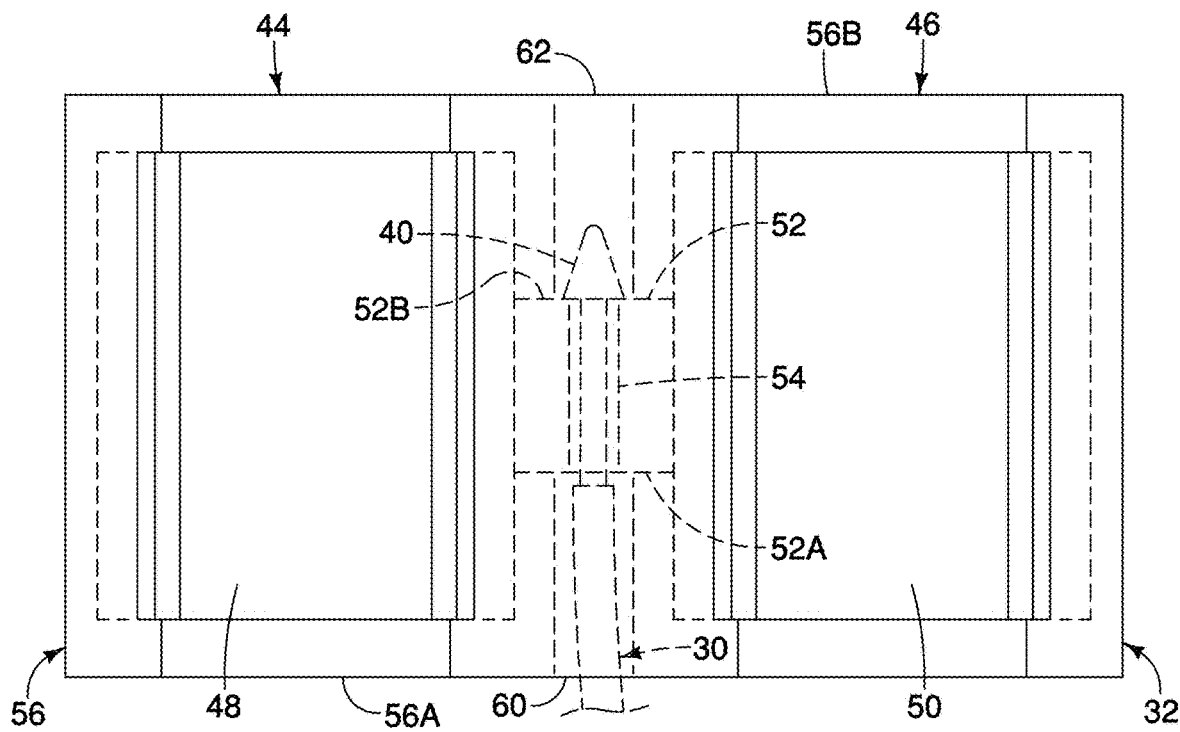
FIG. 6 is a top plan view of the pipe connector of FIG. 3 in which a conductive plastic tether is connected thereto.
Figure 7:
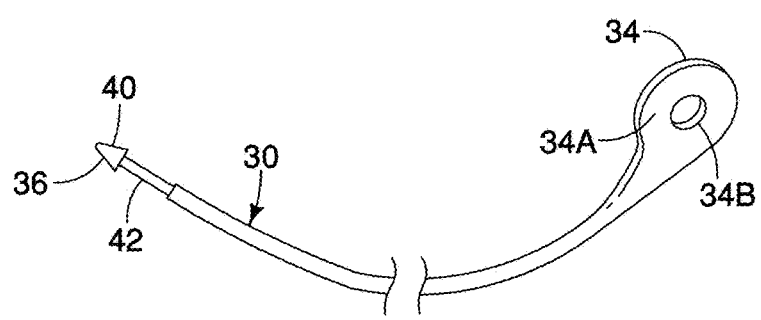
FIG. 7 is a perspective view of the conductive plastic tether of FIG. 3.

A bridge member 52 electrically connects the first and second pipe receiving layers 48 and 50, as shown in FIGS. 4-6. A bore 54 passes completely through the bridge member 52 from a first surface 52A to an oppositely disposed second surface 52B. The bridge member 52 and the first and second pipe receiving layers 48 and 50 are preferably unitarily formed as a one-piece member.

The pipe connector 32 includes a housing 56, as shown in FIGS. 3 and 4. A space 58 is defined in the housing 56 and extends between the first and second pipe receiving portions 46 and 48. The space 58 receives the bridge member 52. A first opening 60 extends from a first outer surface 56A of the housing 56 to the passage 58. A second opening 62 extends from a second outer surface 56B of the housing to the passage 58. The first and second openings 60 and 62 are coaxial. The housing is preferably made of a polyolefin monomer, such as polyoxymethylene (POM), but can be made of any suitable material.

The pipe connector 32 can be made in any suitable manner, such as by a two-shot molding process or by injection molding. The housing has a plurality of recesses 56C formed in an upper surface 56D that receive the first and second pipe receiving layers 48 and 50, as shown in FIG. 3. The recesses 56C prevent movement of the first and second pipe receiving layers 48 and 50 relative to the housing 56. As shown in FIGS. 5 and 6, the bore 54 in the bridge member 52 is aligned with the first and second openings 60 and 62 in the housing 56, such that the bore 54 and the first and second openings 60 and 62 are coaxial.

Although shown having first and second pipe receiving portions 44 and 46, the housing 56 can have only a single pipe receiving portion 44. In such an embodiment, only the first pipe receiving layer 48 is necessary, in addition to the bridge member 52.

The pipe connector 32 is connected to the engine fuel supply pipe 18 and to the engine fuel return pipe 20, as shown in FIGS. 1 and 2. The pipe connector 32 flexes such that the engine fuel supply pipe 18 and the engine fuel return pipe 20 are securely received by the pipe connector 32. A distance between free ends of each of the first and second pipe receiving layers 48 and 50, respectively, is less than the diameters of the engine fuel supply pipe 18 and the engine fuel return pipe 20 such that the pipe connector 32 is substantially prevented from being accidentally removed from the engine fuel supply pipe 18 and the engine fuel return pipe 20. The first and second pipe receiving layers 48 and 50 of the first and second pipe receiving portions 44 and 46 directly contact the engine fuel supply pipe 18 and the engine fuel return pipe 20, respectively. Preferably, as shown in FIGS. 1 and 2, the portion 18C of the engine fuel supply pipe 18 not having the polypropylene (PP) coating 18C is received by the first pipe receiving portion 44 and in direct contact with the first pipe receiving layer 48.

The second end 36 of the tether 30 is passed through the first opening 60 in the first outer surface 56A of the housing 56, as shown in FIG. 6. The second end 36 of the tether 30 is further inserted such that the retaining member 40 passes through the bore 54 in the bridge member 52. The retaining member 40 flexes to allow the second end 36 of the tether 30 to be inserted through the bore 54. An outer diameter of the retaining member 40 is larger than a diameter of the bore 54, thereby substantially preventing accidental withdrawal of the tether 30 from the bridge member 52. The retaining member 40 is disposed in the second opening 62 of the housing 56. The diameters of the first and second openings 60 and 62 in the housing 56 are larger than a diameter of the bore 54 in the bridge member 52, as shown in FIGS. 5 and 6, thereby facilitating insertion of the retaining member 40 through the first opening 60 and reception of the retaining member 40 in the second opening 62. The diameter of the bore 54 is preferably substantially equal to or slightly less than the diameter of the reduced diameter portion 42 of the tether 30, thereby forming a friction fit between the bridge member 52 and the tether 30. The reduced diameter portion 42 of the tether 30 is disposed in the bore 54 of the bridge member 52 in an assembled state of the tether 30 and the pipe connector 32.

The first end 34 of the tether 30 is connected to the bracket 26 of the vehicle frame, as shown in FIGS. 1 and 2, by a fastener 38. A bracket fastener opening 26A receives the fastener 38. The fastener 38 can be any suitable fastening member, such as a screw or plastic clip. The fastener 38 secures the first end 34 of the tether 30 to the bracket 26 such that the enlarged portion 34A of the tether 30 contacts the bracket 26.

An electrical path is formed from the portion 18C of the engine fuel supply pipe 18, to the first pipe receiving layer 48, to the bridge member 52, to the reduced diameter portion 42 of the tether 30, and through the tether to the bracket 26 connected to the vehicle frame, thereby providing a ground path to discharge an electrostatic charge. The engine fuel supply pipe 18 and the engine fuel return pipe 20 directly contact the first and second pipe receiving layers 48 and 50, thereby forming an electrical path between each of the engine fuel supply pipe 18 and the engine fuel return pipe 20 and the first and second pipe receiving layers 48 and 50. The bridge member 52 is unitarily formed as a one-piece member with the first and second pipe receiving layers 48 and 50, such that an electrical path is formed between each of the first and second pipe receiving layers 48 and 50 and the bridge member 52. The fiction fit between the reduced diameter portion 42 of the tether 30 and the bridge member 52 provides direct contact between the reduced diameter portion 42 of the tether 30 and the bridge member 52, thereby forming an electrical path therebetween. The tether 30 is unitarily formed as a one-piece member such that an electrical path is formed from the reduced diameter portion 42 to the enlarged portion 34A of the tether 30. The enlarged portion 34A of the tether 30 is disposed in contact with the bracket 26 of the vehicle frame, such that an electrical path is formed between the tether and the vehicle frame. The electrical path is formed from each of engine fuel supply pipe 18 and the engine fuel return pipe 20 to the vehicle frame, thereby providing a grounding path to discharge an electrostatic charge from the engine fuel supply pipe 18 and the engine fuel return pipe 20 to the vehicle frame.

Figure 10:
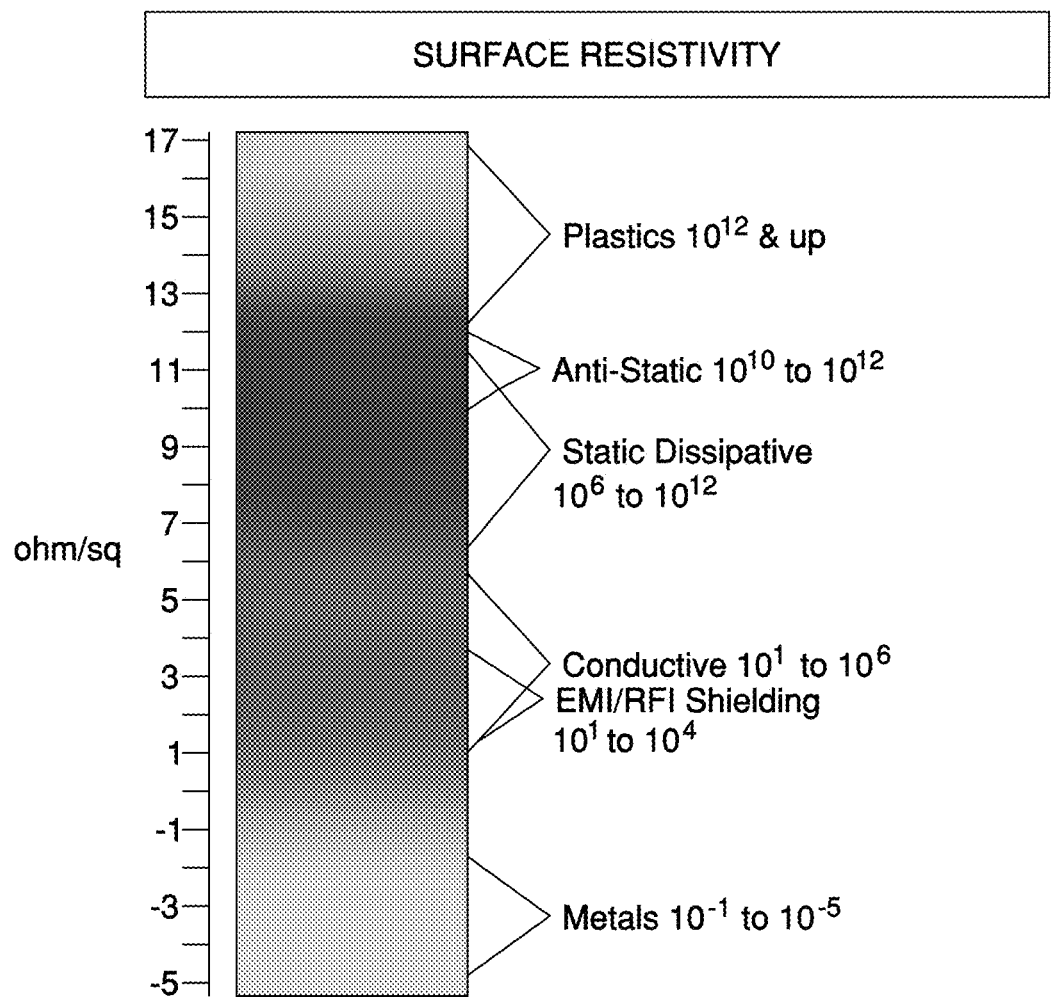
FIG. 10 is a graphical illustration of the surface resistivity of various materials.

The tether 30, the first and second pipe receiving layers 48 and 50, and the bridge member 52 are preferably made of a conductive plastic material. The plastic material can be any suitable plastic material, such as nylon (PA), polypropylene, or acetal (POM). The conductive additive added to the plastic can be any suitable conductive material, such as carbon particles, carbon nanotubes, metal particles or fibers, or metal plated carbon particles. Preferably, the conductive plastic material is a thermoplastic elastomer including carbon black, although any suitable conductive plastic material can be used. A surface resistivity of various materials in illustrated in FIG. 10. As shown, plastics have a high surface resistivity, such that plastics conduct electricity poorly. The addition of a conductive additive to a plastic material decreases the surface resistivity, thereby providing a conductive member. The surface resistivity of the conductive plastic tether 30 is approximately between $7 \times 10^9$ to $1 \times 10^{13}$ ohms per square, although the conductive plastic tether can have any surface resistivity that facilitates forming an electrical path through which an electrostatic charge can be discharged. The conductive plastic material is also resistant to corrosion and is less than expensive compared to a metallic material.

Second Exemplary Embodiment

Figure 8:
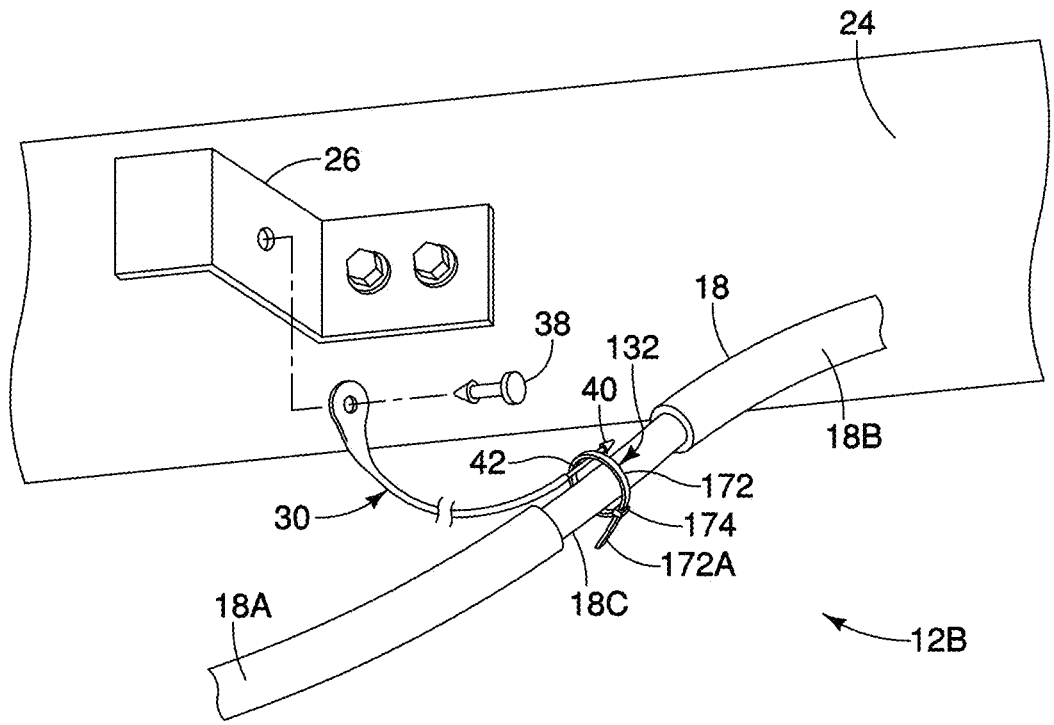
FIG. 8 is an exploded perspective view of an electrostatic discharge assembly in accordance with another exemplary embodiment of the present invention.
Figure 9:
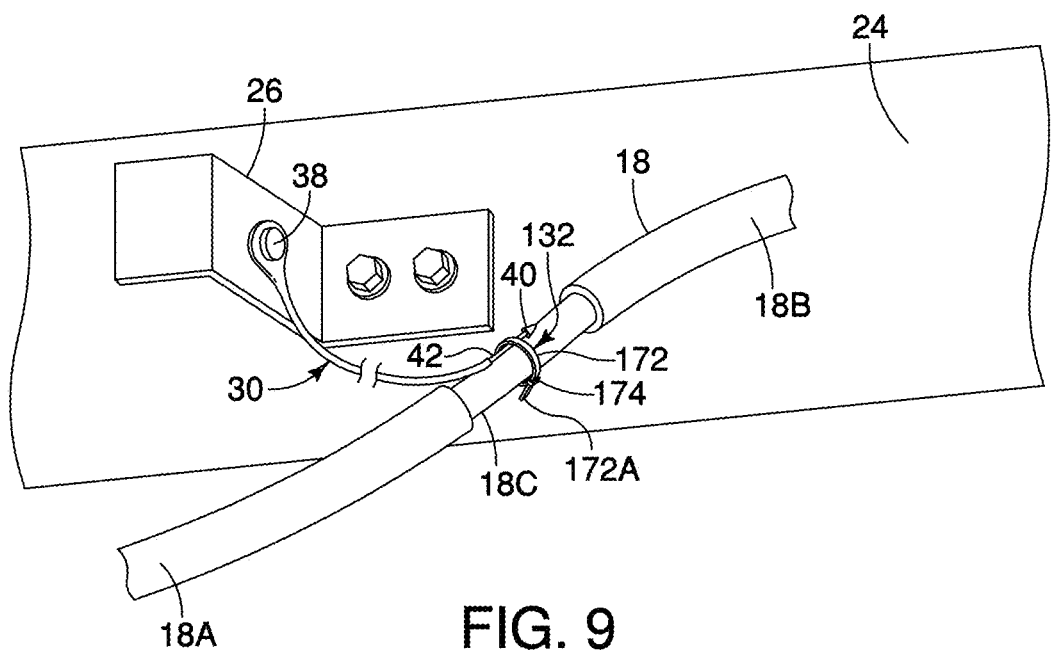
FIG. 9 is a perspective view of the electrostatic discharge assembly of FIG. 8 in which the electrostatic discharge assembly is connected to a vehicle frame.

As shown in FIGS. 8 and 9, an electrostatic discharge assembly 128 in accordance with a second exemplary embodiment of the present invention is substantially similar to the electrostatic discharge assembly 28 of the first exemplary embodiment except for the differences described below. In view of the similarity between the first and second exemplary embodiments, the parts of the second exemplary embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second exemplary embodiment that differ from the parts of the first exemplary embodiment will be indicated with similar reference numerals, except increased by 100 (i.e., 1xx).

The pipe connector 132 comprises a cable tie 170, as shown in FIGS. 8 and 9. The cable tie 170 includes a lane section 172 having a first end and a second end. A locking member 174 is disposed at a first end of the tape section 172. A plurality of teeth extend outwardly from a surface of the tape section 172. The tape section 172 is disposed around an entire circumference of the portion 18C of the engine fuel supply pipe 18 that docs not have the polypropylene (PP) coating. The second end 172A of the tape section 172 is passed through the locking member 174 to form an opening. The second end of the tether 30 is passed through the opening, as shown in FIG. 8. The second end 172A of the tape section 172 is pulled through the locking member 174 until the tape section 172A is lightly wrapped around the entire circumference of the portion 18C of the engine fuel supply pipe 18 with the reduced diameter portion of the tether disposed between the portion 18C of the engine fuel supply pipe 18 and the cable tie 170 such that the tape section 172 directly contacts the portion 18C of the engine fuel supply pipe 18 and the reduced diameter portion of the tether 30.

A pawl disposed in the locking member 174 of the cable tie 170 forms a ratchet with the teeth of the tape section 172, thereby allowing the tape section 172 to be passed through the locking member to decrease the size of the opening formed by the cable tie and preventing the tape section 172 from pulled out of the locking member 174 in a direction to increase the size of the opening. The retaining member of the tether 30 substantially prevents accidental removal of the tether from the engagement of the cable tie 170 with the engine fuel supply pipe 18.

An electrical path is formed from the engine fuel supply pipe 18, to the cable tie 170 of the pipe connector 132, to the tether 30 and to the bracket 26 connected to the vehicle frame, thereby providing a ground path to discharge an electrostatic charge. The engine fuel supply pipe 18 directly contacts the cable tie 170, thereby forming an electrical path between the engine fuel supply pipe 18 and the cable tie 170. The cable tie 170 directly contacts the reduced diameter portion 42 of the tether 30, thereby forming an electrical path therebetween. The tether 30 is unitarily formed as a one-piece member such that an electrical path is formed from the reduced diameter portion 42 to the enlarged portion 34A of the tether 30. The enlarged portion 34A of the tether 30 is disposed in contact with the bracket 26 of the vehicle frame, such that an electrical path is formed between the tether and the vehicle frame. The electrical path is formed from the engine fuel supply pipe 18 to the vehicle frame, thereby providing a grounding path to discharge an electrostatic charge from the engine fuel supply pipe 18 to the vehicle frame.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle equipped with the electrostatic discharge assembly. Accordingly, these terms, as utilized to describe the present invention should be interpreted relative to a vehicle equipped with the electrostatic discharge assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electrostatic discharge assembly for a vehicle, comprising:
   a conductive plastic tether having a first end and a second end, the first end being configured to be connected to a vehicle frame; and
   a pipe connector configured to connect the second end of the conductive plastic tether to a first fuel pipe of the vehicle, the pipe connector having a first pipe receiving portion configured to receive the first fuel pipe and a second pipe receiving portion configured to receive a second fuel pipe.

2. The electrostatic discharge assembly according to claim 1, wherein
   the conductive plastic is a thermoplastic elastomer including carbon black.

3. The electrostatic discharge assembly according to claim 1, wherein
   the first pipe receiving portion includes a first pipe receiving layer configured to directly contact the first fuel pipe received by the first pipe receiving portion, the first pipe receiving layer being made of a conductive plastic material.

4. The electrostatic discharge assembly according to claim 3, wherein
   the second pipe receiving portion includes a second pipe receiving layer configured to directly contact the second fuel pipe received by the second pipe receiving portion, the second pipe receiving layer being made of a conductive plastic.

5. The electrostatic discharge assembly according to claim 4, wherein
   the pipe connector includes a bridge member electrically connecting the first and second pipe receiving layers.

6. The electrostatic discharge assembly vice according to claim 5, wherein
   the bridge member is made of a conductive plastic material.

7. The electrostatic discharge assembly according to claim 5, wherein
   a bore passing through the bridge member is configured to receive the second end of the conductive plastic tether.

8. The electrostatic discharge assembly according to claim 7, wherein
   the conductive plastic tether has a reduced diameter portion configured to be disposed within the bore, and a retaining member having a larger diameter than the bore to substantially prevent withdrawal of the conductive plastic tether.

9. The electrostatic discharge assembly according to claim 8, wherein a first opening extends from a first side of the pipe connector to a first side of the bridge member and a second opening extends from a second side of the pipe connector to a second side of the bridge member to provide access to the bore.

10. The electrostatic discharge assembly according to claim 9, wherein the conductive plastic tether is configured to be inserted into the bore through the first opening, and the retaining member is configured to be disposed in the second opening when the conductive plastic tether is connected to the pipe connector.

11. The electrostatic discharge assembly according to claim 1, wherein a fastener receiving opening disposed proximal the first end of the conductive plastic tether is configured to receive a fastener to connect the conductive plastic tether to the vehicle frame.

12. The electrostatic discharge assembly according to claim 5, wherein the first and second pipe receiving portions and the bridge member are made of a thermoplastic elastomer including carbon black.

13. A fuel supply system of a vehicle, comprising: a first fuel pipe; a second fuel pipe; a conductive plastic tether having a first end and a second end, the first end being connected to a vehicle frame; and a pipe connector connecting the second end of the conductive plastic tether to the first fuel pipe of the vehicle, a first pipe receiving portion of the pipe connector receiving the first fuel pipe and a second pipe receiving portion of the pipe connector receiving the second fuel pipe.

14. The fuel supply system according to claim 13, wherein the first pipe receiving portion includes a first pipe receiving layer directly contacting the first fuel pipe and the second pipe receiving portion includes a second pipe receiving layer directly contacting the second fuel pipe, the first and second pipe receiving layers being made of a conductive plastic material.

15. The fuel supply system according to claim 14, wherein the pipe connector includes a bridge member electrically connecting the first and second pipe receiving layers, the bridge member being made of a conductive plastic material; and a bore passing through the bridge member receives the second end of the conductive plastic tether.

16. An electrostatic discharge assembly for a vehicle, comprising: a conductive plastic tether having a first end and a second end, the first end being configured to be connected to a vehicle frame; and a cable tie configured to connect the second end of the conductive plastic tether to a fuel pipe of the vehicle, the cable tie being configured to be disposed on an outer surface of an uncoated portion of the fuel pipe, and the second end of the conductive plastic tether being disposed between the outer surface of the fuel pipe and the cable tie.

17. The electrostatic discharge assembly according to claim 16, wherein a portion of the second end of the conductive plastic tether disposed between the outer surface of the fuel pipe and the cable tie has a diameter less than a diameter of the first end of the conductive plastic tether.

18. The electrostatic discharge assembly according to claim 16, wherein the uncoated portion of the fuel pipe has a diameter less than a diameter of a coated portion of the fuel pipe.

19. The electrostatic discharge assembly according to claim 17, wherein a retaining member is disposed at the second end of the conductive plastic tether, the retaining member having a diameter larger than the diameter of the portion of the second end of the conductive plastic tether disposed between the outer surface of the fuel pipe and the cable tie.

\* \* \* \* \*